United States Patent [19]

Stanfield

[11] 4,358,893
[45] Nov. 16, 1982

[54] TIRE TRIMMER

[75] Inventor: Charles K. Stanfield, Matteson, Ill.

[73] Assignee: B & J Manufacturing Company, Glenwood, Ill.

[21] Appl. No.: 255,706

[22] Filed: Apr. 20, 1981

[51] Int. Cl.³ .............................................. B26B 3/00
[52] U.S. Cl. ...................................... 30/280; 30/338; 30/355
[58] Field of Search ......................... 30/280, 355, 338

[56] References Cited

U.S. PATENT DOCUMENTS

| D. 104,608 | 5/1937 | Bricker | 30/315 |
|---|---|---|---|
| 397,692 | 2/1889 | Clark | 30/355 |
| 437,325 | 9/1890 | Barclay | 30/355 |
| 486,426 | 11/1892 | Brooks | 30/355 |
| 542,583 | 7/1895 | Ball | 30/355 |
| 697,167 | 4/1902 | Phillips | 30/315 |
| 790,806 | 5/1905 | Savidge | 30/315 |
| 1,788,875 | 1/1931 | Kandle | 30/315 |
| 2,086,620 | 7/1937 | Hoffman | 30/355 |
| 2,151,577 | 3/1939 | Withington | 30/355 |
| 2,286,190 | 6/1942 | Abrahamsen | 30/355 |
| 2,783,537 | 3/1957 | Gringer | 30/355 |
| 2,992,483 | 7/1961 | Ricci | 30/280 |

Primary Examiner—Stephen G. Kunin
Assistant Examiner—J. T. Zatarga
Attorney, Agent, or Firm—Emrich, Lee, Brown & Hill

[57] ABSTRACT

A tire trimmer tool has an elongated handle and a U-shaped frame to which a blade of undulated sheet metal is detachably mounted. The undulations comprise closely-spaced parallel ridges which extend front and rear, are open on their underside and are united by narrow connecting webs. The undulations are arranged across the full width of the blade; and the outermost undulations which comprise the two sides of the blade have upturned walls, the edge of which seat is facing slots provided the legs of the U-frame; and an adjustable clamp which connects the two legs secures the blade in place. The fore end of the blade is sharpened on its underside and a narrow transverse portion of the blade therebehind is struck or turned upwardly across the full width of the blade and limits bowing of the blade in response to tightening of the clamp.

6 Claims, 9 Drawing Figures

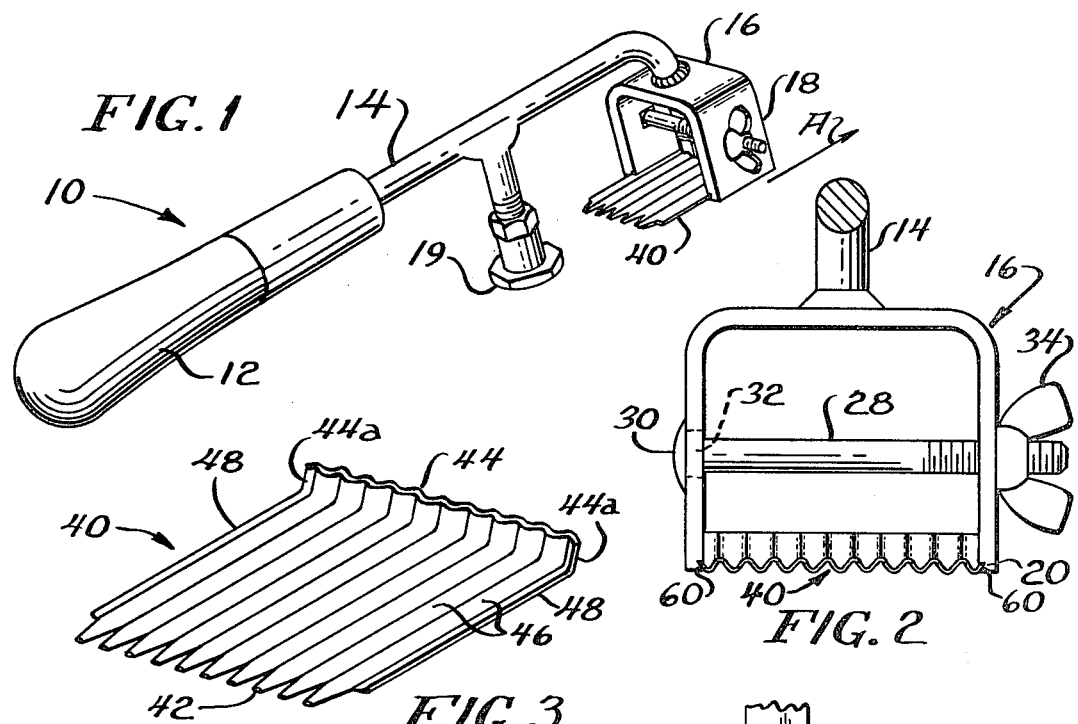
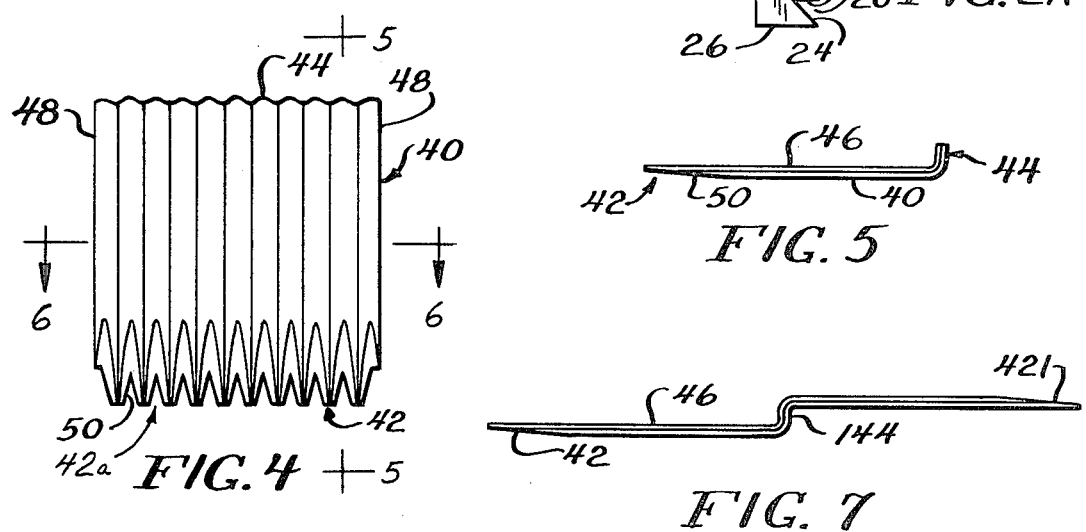
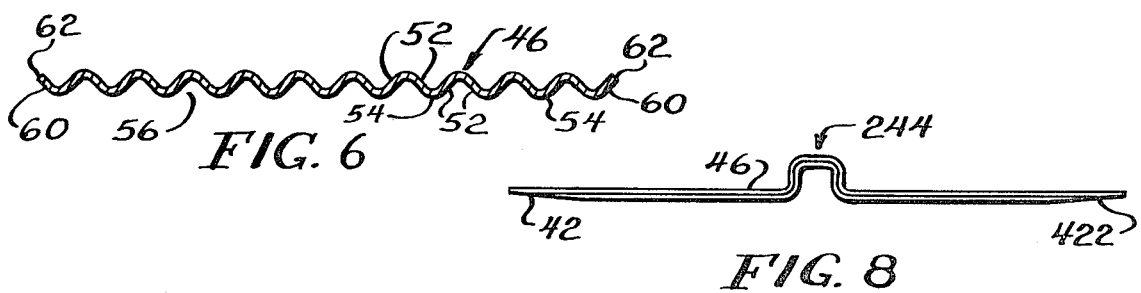

TIRE TRIMMER

This invention relates to tire trimmers which are used by tire molders and/or retreading shops to remove protuberances, tips and like mold flash which remains on the newly-molded tread, shoulder or sidewall of the tire after its separation from the mold members.

Tools for this purpose are well known in the art. Conventionally, they have utilized rigid blades of solid sheet metal having a serrated leading edge which catch the protuberances and a planiform surface which rides on the tire surface. See, for example, U.S. Pat. Nos. Fryer et al 2,807,877; Glodde, 2,810,193; and Ricci, 2,992,483. One of the problems inherent in the use of such tools is the difficulty which is experienced in controlling the attack of the blade edge on the surface of the tire carcass. Such blades cut only the flash or protuberances which are caught by the serrations and pass over the flash and trimmings which do not align therewith. These cause the tool to bounce or rock on the tire surface. Of consequence, some of the protuberances or tips are missed altogether whereas others are not cut close to the carcass surface, and stubble of varying heights remain. The poor contact or bouncing of the tool on the tire carcass surface creates other problems. For example, the tool may dig into or catch on the tread surface of the tire with consequent injury to the tire itself and also to the operator if he does not have a firm grip on the tool.

Stanfield, U.S. Pat. No. 4,021,912 discloses an improvement over such tire trimmers wherein the blade is formed of undulated sheet metal and has flat laterally disposed flanges by means of which it is mounted on a holder. The holder is comprised of tubular stock which is bent to define a hand grip portion and has a pair of parallel end-slotted rod portions. The latter are inclined to said hand grip portion and removably receive flat mounting flanges of the sheet metal blade. The blade undulations extend generally front and rear or axially of the holder and define closely spaced raised ridges with narrow intervening webs therebetween which ride the tire surface. The underside of the leading edge of these blades is sloped or sharpened along an arc or at an angle which creates recesses in its leading edges between the ridges. These recesses have sharp cutting edges which are capable of cutting the entering flash close to the tire surface whereas the open area beneath the ridges on either side of the webs provide clearance or a path through which uncut flash and trimmings may move. Of consequence, the blade is less subject to bounce and is more easily handled by the operator, and close shearing of the protuberances is not interrupted.

A tire trimmer blade in accordance with this invention is also constructed of sheet metal which is folded so as to comprise closely spaced, parallel straight undulations or ridges which extend fore and rear, are open throughout the length of their underside and united by narrow connecting webs as described in the forementioned Stanfield U.S. Pat. No. 4,021,912.

However, a distinguishing feature of this invention is that the undulations or ridges are arranged across the full width of the blade and the folding is so undertaken that the undulations at the two sides of the blade terminate short of their apex whereby they present free ends along the length of the blade which face up and removably seat in facing slots provided the legs of a blade supporting frame in which the blade is assembled. The blade is then secured in place by tightening an adjustable clamp which connects the two legs.

Thus, a further feature of the invention is the elimination of the mounting flanges of the Stanfield blade and with a consequent increase in the working edge of the blade to the width of the holder.

Still another feature of the invention is that the underside of the blade is disposed below the free ends of the supporting legs of the tool blade holder wherefore the blade assumes a stable position on the tire surface.

A further feature of the invention is that a transverse portion of the blade behind its sharpened fore end is so folded across the width of the blade that it also projects upwardly but at right angles to the upwardly facing edges of the outermost ridges by which the blade is assembled with its holder. Such portion may be termed a rib and affords strength and shape retention to the blade such that the blade resists bowing in response to tightening of the clamp. The blade is thus solidly supported by the holder and is also readily separable therefrom when necessary.

In a preferred form of the invention, a narrow portion along the rear edge of the blade is upturned across the full width of the blade whereas in an alternative construction, the upturned reinforcing rib may be located intermediate the sharpened fore end and rear end of the blade. This latter arrangement is particularly suitable where the blade is to be sharpened along both its leading edge and its trailing edge to double the life of the blade.

Still another feature of the invention is that the upturned narrow rib portion also serves to locate the blade in the holder and provide support for holding the blade edgewise.

The aforesaid modifications of the blade do not substantially complicate or increase the costs of the manufacturing process but do substantially increase the utility of the blades.

Other objects, advantages and/or features of the invention will be at once apparent or will become so particularly upon consideration of the embodiments thereof which now will be described.

Referring, therefore, now to the drawing and the several figures thereof wherein like parts are identified by like reference numerals, FIG. 1 is a perspective view of a tire trimmer tool having a blade in accordance with the invention assembled with the supporting frame of said tool;

FIG. 2 is an end view of the tool and shows further details in the assembly of the blade with the tool holder;

FIG. 2A is a fragmented view of one leg of the blade supporting frame which is illustrated on a larger scale to detail the shape of the slots which receive the side edges of the blade;

FIG. 3 is a top view of the blade which is shown separate from its holder;

FIG. 4 is a bottom plan view of the blade;

FIG. 5 is a sectional view taken lengthwise through the blade along lines 5—5 of FIG. 4;

FIG. 6 is a cross-sectional view taken through the blade of FIG. 4 along lines 6—6;

FIG. 7 is a view generally similar to FIG. 5 and shows an alternate construction of blade; and FIG. 8 shows another alternate construction.

Referring now more specifically to the several views and first to FIG. 1, 10 identifies a holder in which a blade 40 constructed in accordance with this invention may be detachably mounted. Said holder 10 comprises a hand grip portion 12 which is suitably staked to the forward end of a metal shaft 14 which in turn is welded to the bight portion of a U-shaped blade supporting frame 16. Optionally, shaft 14 may support a vertically disposed adjustable fulcrum rest member as illustrated at 19. Hand grip portion 12 may be formed of wood, plastic or other suitable material and have a shape which is comfortable to the operator's grasp.

The U-shaped blade supporting frame member 16 of said tool 10 as shown in FIGS. 1 and 2 has spaced parallel legs 18 provided with facing blade edge receiving slots 20 which are illustrated on a larger scale in FIG. 2A. As shown in said FIG. 2A, the slots 20 comprise a generally-horizontal upper first surface 22, and an inclined lower second surface 24 which substantially intersects the lower edge 26 of the leg 18 and also the upper surface 22 of the slot 20. Said slots 20 serve to receive and seat the opposed side edges of the blade 40 as afterwards described in response to tightening of an adjustable clamp member 28. Said clamp member is illustrated as comprising a bolt having an enlarged head 30 and a squared shank 32 which non-rotatably seats in a similar squared opening through one of said frame legs 18. The threaded opposite end of bolt 28 extends through a similarly-located opening in the other leg 18. By tightening wing nut 34 on said threaded end of bolt 28, the two legs 18 may be drawn towards each other so as to lock the blade 40 in place therebetween.

Referring now to FIGS. 3, 4, 5 and 6, a blade 40 comprising this invention is generally rectangular in shape and has both a serrated forward edge 42 comprising recesses 42a and an upturned rear edge portion 44. Therebetween, blade 40 is characterized by regular rows or series of closely-arranged, generally parallel disposed undulations or ridges 46 which extend fore and aft and generally parallel the opposed side edges 48 of the blade 40 between said fore and aft ends 42, 44. These ridges 46 have parallel sloping sidewalls 52 which unite with connecting webs 54. They are open on their underside 56 through the full length of the blade including through the front and rear edge portions 42, 44 of the blade.

In accordance with the invention, the blades are formed from coiled sheet metal, for example, a suitable specialty spring steel or other sheet metal which is flexible and hard yet break-resistant, therefore, capable of being folded by passing between the rollers of a roll mill through which the sheet metal is fed to form the undulations represented by said ridges 46 and intermediate connecting webs 54.

A feature of the invention is that the coiled sheet stock is centered with the rolling mill so that the undulations into which the sheet stock is folded by the action of the rollers of the mill are arranged in regularly, closely spaced rows which extend both fore and aft and also paralleling to the side edges 48 of the blade, and so that the outermost undulation at the two sides 48 of the blade terminate short of the apex thereof as illustrated in FIG. 6. Thus, the blade 40 is characterized by upwardly standing inclined walls 60 at the opposed sides of the blade which face upwardly at substantially the same angle and distance. The edges 62 of these walls seat within the provided slots 20 of the holder and replace the flanges of the blades disclosed by Stanfield U.S. Pat. No. 4,021,912.

As the folded or undulated sheet metal exits from the mill, it is cut into appropriate lengths as illustrated, and the rear end 44 thereof is folded upwardly as illustrated in FIG. 3 so as to be disposed in the same general direction as are the upturned sidewalls 60 of the blade. As illustrated in FIG. 3, said rearward edge 44 is folded upwardly across the full width of the blade to substantially a 90° angle. This folded portion 44 which may be relatively narrow serves as a rib which imparts strength and rigidity to the blade and resists bowing of the blade as when it is assembled with its side edges 62 within slots 20 of the U-supporting frame and secured by tightening of clamp 28. The blade is completed by grinding or otherwise sharpening the forward edge of the blade on the underside thereof at 50 across the full width of the blade. Said grinding may be on either a constant or a variable radius, a compound angle, or some combination of angles and radii thereof as disclosed in the Standfield patent, supra, which affords a blunted end to the ridges 40 and an acutely sharp edge to the leading edge of the interconnecting webs 54 which form the serrations or recesses 42a between the paired ridges 46. Importantly, the ridges are closely folded and on sharp radii which approach the sheet metal thickness such that the intermediate webs 54 are relatively narrow as are also the apex of the hollows or grooves on the underside of the raised ridges 46. Significantly, the hollows or opening beneath the ridges as well as the spaces therebetween and over the webs are not substantially wider than the mold tips or protuberances which the tool is intended to remove from the newly-molded tire tread carcass.

Thus, a feature of the invention is that the fore and aft extending undulations are not only arranged in rows across the full width of the blade but, as noted in FIG. 2, also have a vertical dimension such that when their side edges 62 seat within provided slots 20 of the tool, the underside of the webs 54 are disposed below a plane represented by the terminal ends 26 of the legs 18 which define the blade supporting frame 16.

Furthermore, as illustrated by the drawing, the undulations or ridges 46 which comprise the working area of the blade extend through the full separation of the legs 18 and may be characterized as having a generally v-shaped cross section which is rounded at the apex thereof. In a preferred blade form, the walls of these raised ridges 46 include an angle of approximately 60° and less than 90°. The openings 56 therebeneath have an approximate height and width of roughly 0.150 inches at their widest point. When blade 40 is thus assembled within the holder as above described, the folds 46 may be described as consisting of closely spaced parallel straight raised ridges having their inclined walls 52 united by the aforementioned intervening narrow webs 54 which contact the tire carcass surface in the use of the tool. A feature of the construction is that the openings or hollows beneath these ridges 46 and on either side of the webs are not only open at both ends and along their full extent but that the webs are correspondingly narrow in width so as to have essentially linear contact with the tire surface at spaced intervals across the blade width.

In use, the tool is grasped by its hand grip portion 12 and so that its blade 40 is held firmly against the surface of the tire. With the tire rotating in the direction indicated by the arrow A, (FIG. 1) those mold protuberances or tips which align with the recesses between the leading ends of the raised projections are wedged thereby and cleanly cut by the acutely-sharpened apex of said recesses so as to be sheared with continued rotation of the tire. Those protuberances or tips which are not collected by the recesses are channeled beneath the ridge 46 and pass therebeneath. In passing beneath the ridges 46, the tips or protuberances may slightly bow in order to conform to the cross-section of said hollows but are otherwise free to move or pass unimpeded beneath the blade and outwardly therefrom with continued rotation of the tire. Of consequence, the tool blade is not lifted from the tire surface and bouncing of the tire trimmer on the tire is not a problem.

In assembling the blade 40 between the two legs 18 of the blade mounting frame 16, the upturned rear edge portion 44 of the blade not only affords strength and shape retention to the blades so as to resist bowing of the blade in response to tightening of the wing nut 34, but outer portions 44a may be caused to engage the rear side of legs 18 to assure a stable solid supported position for blade, and wherefore the leading edge 42 of the blade may be repetitively located.

As illustrated by FIGS. 7 and 8, the blade may be upturned midway of its fore and rear ends. Thus, for example, when both said fore and rear edges ends of the blade are sharpened to double the life of the blade, as illustrated in FIG. 7, an intermediate portion 144 of the blade may be folded into a vertical disposition and portions of the blade forward and rearward thereof may be displaced into generally parallel spaced planes. In this event, their outer ends 42 and 421 are sharpened on reverse sides of the blade. In the embodiment of FIG. 8, wherein the intermediate portion of the blade is struck at 244, the two halves of the blade may remain in the same plane and wherefor the sharpened edges 42 and 422 are disposed to the same side of the blade.

It will be further understood that although the struck portion 244 of FIG. 8 which forms the rigidifying rib is illustrated as assuming a square shape in cross-section, the same could be given a triangular, or arcuate, or other convenient shape; and can also be differently dimensioned.

Thus, embodiments of the invention having been described, what is claimed is:

1. A tire trimming tool used to remove mold tips from tire carcasses, said tool having a pair of parallel spaced legs to the upper portion of which is fixed a forwardly-extending handle, the parallel spaced legs containing blade mounting slots in their facing sides adjacent the lower free ends thereof; and a blade of sheet metal therebetween which is folded to define closely-spaced generally parallel straight ridges with intervening narrow grooves which extend lengthwise forwardly and rearwardly and have laterally sloping opposed sidewalls which define open-ended hollows on the base side of the ridges with intermediate connecting web portions therebetween;

the forward edge of said blade facing the handle containing recesses between the paired ridges and being sharpened on the underside thereof;

the outer ridges along the two sides of the blades each terminating in an upturned sidewall having an upper end which engages within a respective one of the two facing slots of the U-shaped frame legs; and the blade having rigidifying means in the form of an upturned portion which is disposed behind said sharpened leading edge of the blade and extends laterally across the full width of the blade.

2. Blade for a tire trimming tool used to remove mold tips from tire carcasses comprising a generally rectangular-shaped member of undulated sheet metal characterized in that the undulations embody closely spaced fore-and-aft-extending, generally parallel, straight, raised ridges having laterally sloping opposite sidewalls which are united with intermediate web portions disposed therebetween and lying in a common plane, the raised ridges being open along their underside through the full length of the blade including the fore-and-aft ends of the blade;

the undulations at the two opposite side edges of the blade terminating in upwardly-inclined, fore-and-aft-extending walls which present their free ends lengthwise of the blade and at a height below that of the ridges and above that of the connecting webs;

the forward end of the blade containing recesses between each of the paired ridges;

the underside of said forward end including said recesses being sharpened across the full width of the blade such that the leading edge of the webs which trail the foreward end of the ridges shear mold tips caught in the recesses as uncaught tips are guided therebetween through the openings beneath the ridges; and a transversely extending upstanding rib struck across the full width of the blades and behind the sharpened recessed forward end of the blade.

3. Tire trimming tool blade according to claim 2 wherein the rearward edge portion of the blade is turned upwardly across the full width of the blade.

4. Tire trimming tool blade according to claim 2 wherein both the rearward and the forward edges of the blade are sharpened on their underside, and the transversely extending rib portion is disposed intermediate said rear and forward edges.

5. In combination, a blade according to claim 2 and a forwardly extending hand grip portion having a rearwardly-located blade supporting frame embodying spaced legs provided with facing slots at the lower end thereof in which the free edge of the upwardly facing sidewalls of the blade seat, and clamp means connected between said legs which releaseably clamp the blade therebetween.

6. The combination of claim 5 wherein the facing slots at the lower ends of the legs embodying the blade supporting frame have an inclined surface which interrupts the lower end of the legs and a generally horizontal surface thereabove.

* * * * *